US006997293B2

(12) United States Patent
Tomonaga et al.

(10) Patent No.: US 6,997,293 B2
(45) Date of Patent: Feb. 14, 2006

(54) FRONT FORK OF MOTOR CYCLE

(75) Inventors: Takao Tomonaga, Shizuoka (JP); Munemitu Eguchi, Shizuoka (JP)

(73) Assignee: Showa Corporation, Saitama (JP)

( * ) Notice: Subject to any disclaimer, the term of this patent is extended or adjusted under 35 U.S.C. 154(b) by 0 days.

(21) Appl. No.: 10/867,470

(22) Filed: Jun. 14, 2004

(65) Prior Publication Data

US 2005/0145456 A1 Jul. 7, 2005

(30) Foreign Application Priority Data

Dec. 16, 2003 (JP) ............................ 2003-418765

(51) Int. Cl.
*F16F 9/18* (2006.01)

(52) U.S. Cl. .................... 188/315; 188/352; 267/64.28

(58) Field of Classification Search ................ 188/314, 188/315, 352; 256/64.28
See application file for complete search history.

(56) References Cited

U.S. PATENT DOCUMENTS 5,620,172 A * 4/1997 Fulks et al. ................. 267/221
5,727,662 A * 3/1998 Guy et al. .................. 188/315
5,992,585 A * 11/1999 Kazmirski et al. ..... 188/322.14

FOREIGN PATENT DOCUMENTS

| | | |
|---|---|---|
| JP | 55031668 | 6/1980 |
| JP | 2138246 | 11/1990 |

OTHER PUBLICATIONS

Japanese Utility Model Application Laid-open No. HEI 2-138246.
Japanese Utility Model Application Laid-open No. HEI 2-138246.

* cited by examiner

*Primary Examiner*—Matthew C. Graham
(74) *Attorney, Agent, or Firm*—Orum & Roth LLC

(57) ABSTRACT

In a front fork of a motor cycle or the like, an outer peripheral portion of a seat member is clamped and fixed between a bottom portion of an axle bracket and a lower end portion of an axle side tube. A flange portion is provided in an outer periphery of a lower end portion of a holder provided with a compression side partition wall member and valve assembly. An outer periphery of a lower end portion of a damper cylinder is screwed with the seat member. The outer peripheral flange portion of the holder is clamped and fixed between the lower end portion of the damper cylinder and the bottom portion of the axle bracket or the seat member.

5 Claims, 10 Drawing Sheets

FRONT FORK OF MOTOR CYCLE

BACKGROUND OF THE INVENTION

1. Field of the Invention

The present invention relates to a front fork of a motor cycle or the like.

2. Description of the Related Art

In a front fork of a motor cycle or the like, there is a structure in which a vehicle body side tube and an axle side tube are slidably fitted. An axle bracket is fixed to an outer periphery of a lower end portion of the axle side tube. A cylinder inserted to the axle side tube is mounted to a bottom portion of the axle bracket. A piston rod provided with a piston and valve assembly sliding within the cylinder in a leading end portion is mounted to the vehicle body side tube. A compression side partition wall member and valve assembly is provided in an upper end portion of a holder provided in an inner periphery of a lower end portion of the cylinder. An oil reservoir chamber communicated with a lower oil chamber sectioned within the cylinder by the compression side partition wall member and valve assembly is provided between the axle side tube and the cylinder.

In a prior art, the cylinder is mounted to the bottom portion of the axle bracket by screwing a bolt inserted to the bottom portion of the axle bracket from an outer side to the holder provided in the inner periphery of the lower end portion of the cylinder. Further, the bolt can be detached from the holder, and the cylinder and the holder can be taken out to an upper side from the axle side tube, when changing a specification and repairing and replacing the compression side partition wall member and valve assembly provided in the upper end portion of the holder.

However, in the prior art, the bolt passes through the bottom portion of the axle bracket, and there is a possibility of an oil leak.

Accordingly, in Japanese Utility Model Application Laid-open No. 2-138246, an outer edge of a lower end portion **2*d* is formed in an expanded manner in a collar shape in an outer periphery of a holder (a valve body 2C of a base valve portion 2) provided in an inner periphery of a lower end portion of the cylinder clamped between a bottom portion of an axle bracket (a bracket member 4) and a lower end portion of an axle side tube (an outer tube 7**) screwed thereto. In accordance with this structure, the cylinder can be mounted to the bottom portion of the axle bracket without using the bolt passing through the bottom portion of the axle bracket.

However, in the front fork of the motor cycle or the like in Japanese Utility Model Application Laid-open No. 2-138246, it is necessary to cancel the engagement between the axle side tube (the outer tube 7) and the axle bracket (the bracket member 4) when taking out the cylinder and the holder. Accordingly, difficulty is encountered when changing the specification and carrying out the repairing and replacing work of the compression side partition wall member and valve assembly (the base valve portion 2).

SUMMARY OF THE INVENTION

An object of the present invention is to make it easy to change a specification and to carry out repairing and replacing work of a compression side partition wall member and valve assembly, in a front fork of a motor cycle or the like. In particular, in a front fork where a cylinder is mounted to a bottom portion of an axle bracket, and the compression side partition wall member and valve assembly is provided in an upper end portion of a holder provided in an inner periphery of a lower end portion of the cylinder.

In accordance with the present invention, there is provided a front fork of a motor cycle or the like comprising: a vehicle body side tube and an axle side tube being slidably fitted. An axle bracket is fixed to an outer periphery of a lower end portion of the axle side tube. A cylinder is inserted to the axle side tube being mounted to a bottom portion of the axle bracket, and a piston rod provided with a piston and valve assembly sliding within the cylinder in a leading end portion is mounted to the vehicle body side tube. A compression side partition wall member and valve assembly is provided in an upper end portion of a holder provided in an inner periphery of a lower end portion of the cylinder. An oil reservoir chamber is in fluid communication with a lower oil chamber sectioned within the cylinder by the compression side partition wall member and valve assembly being provided between the axle side tube and the cylinder. An outer peripheral portion of a seat member is clamped and fixed between the bottom portion of the axle bracket and the lower end portion of the axle side tube. A flange portion is provided in an outer periphery of a lower end portion of the holder. The outer periphery of the lower end portion of the cylinder is screwed to the seat member, and an outer peripheral flange portion of the holder is clamped and fixed between a lower end portion of the cylinder and the bottom portion of the axle bracket or the seat member.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS

Figure 1:
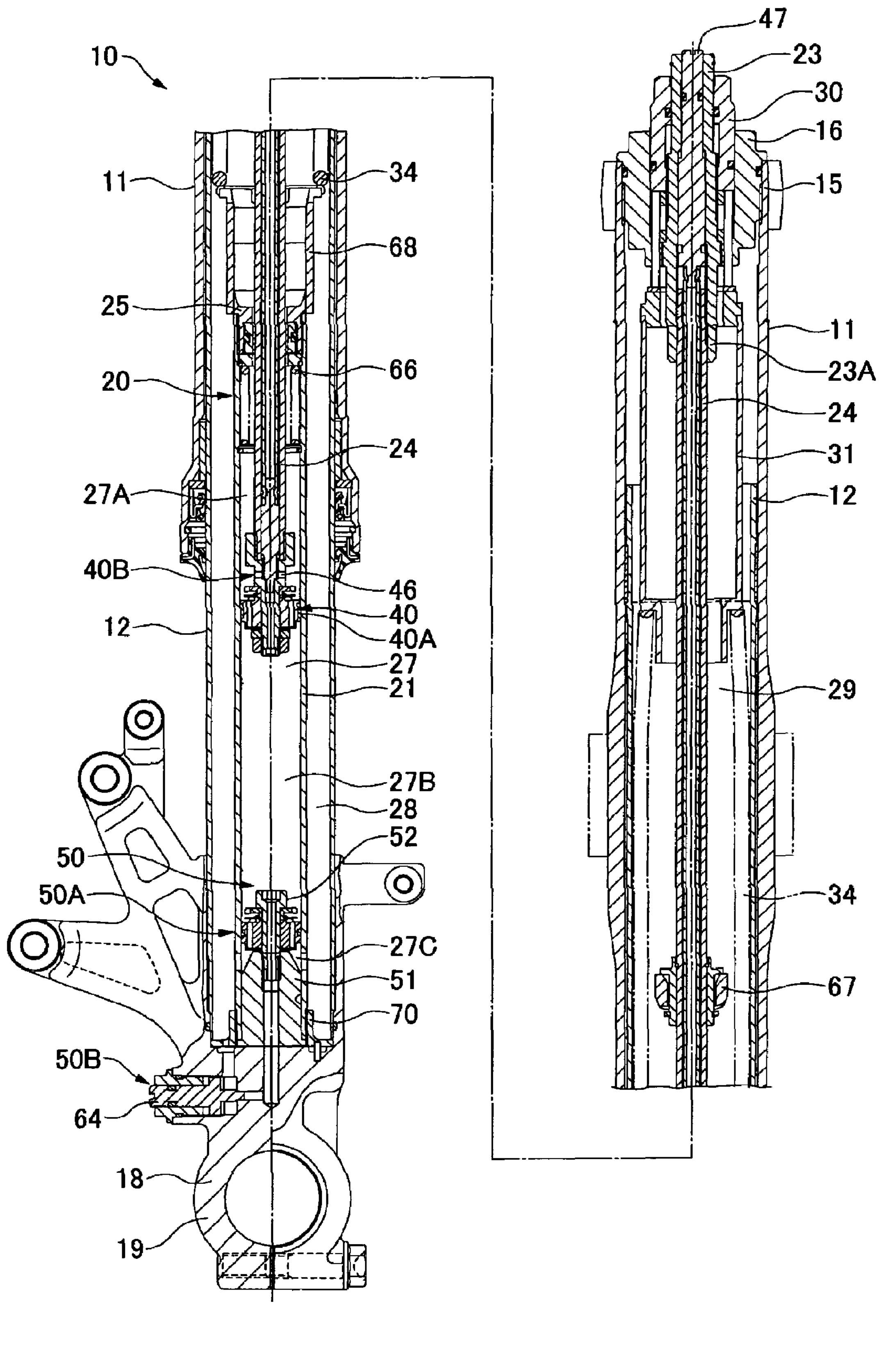
FIG. 1 is a cross sectional view showing a whole of a front fork.

A front fork 10 of a motor cycle or the like is structured by slidably fitting a vehicle side tube 11 and an axle side tube 12 in a liquid tight manner, as shown in FIGS. 1 to 4. A bush 13 is provided in an inner periphery of a lower end of the vehicle body side tube 11, and a bush 14 is provided in an outer periphery of an upper end of the axle side tube 12.

The vehicle body side tube 11 is detachably provided with a cap 16 in an opening portion 15 in an upper end portion thereof in a liquid tight manner, and is provided with a vehicle body side mounting portion in the vehicle body side tube 11. The axle side tube 12 comprises an axle bracket 18 integrally fixed to an outer periphery of a lower end portion, and an axle side mounting portion 19 provided in the axle bracket 18.

The front fork 10 comprises a damper cylinder 21 and a piston rod 24 constituting a damper 20 received in an inner portion of the vehicle body side tube 11 and the axle side tube 12. The front fork 10 comprises the damper cylinder 21 inserted to the axle side tube 12 mounted to the axle bracket 18 in a manner mentioned below. The piston rod 24 is provided with a piston and valve assembly 40A (an expansion side damping force generating apparatus 40) sliding within the damper cylinder 21 in a leading end portion mounted to the vehicle body side tube 11.

Figure 4:
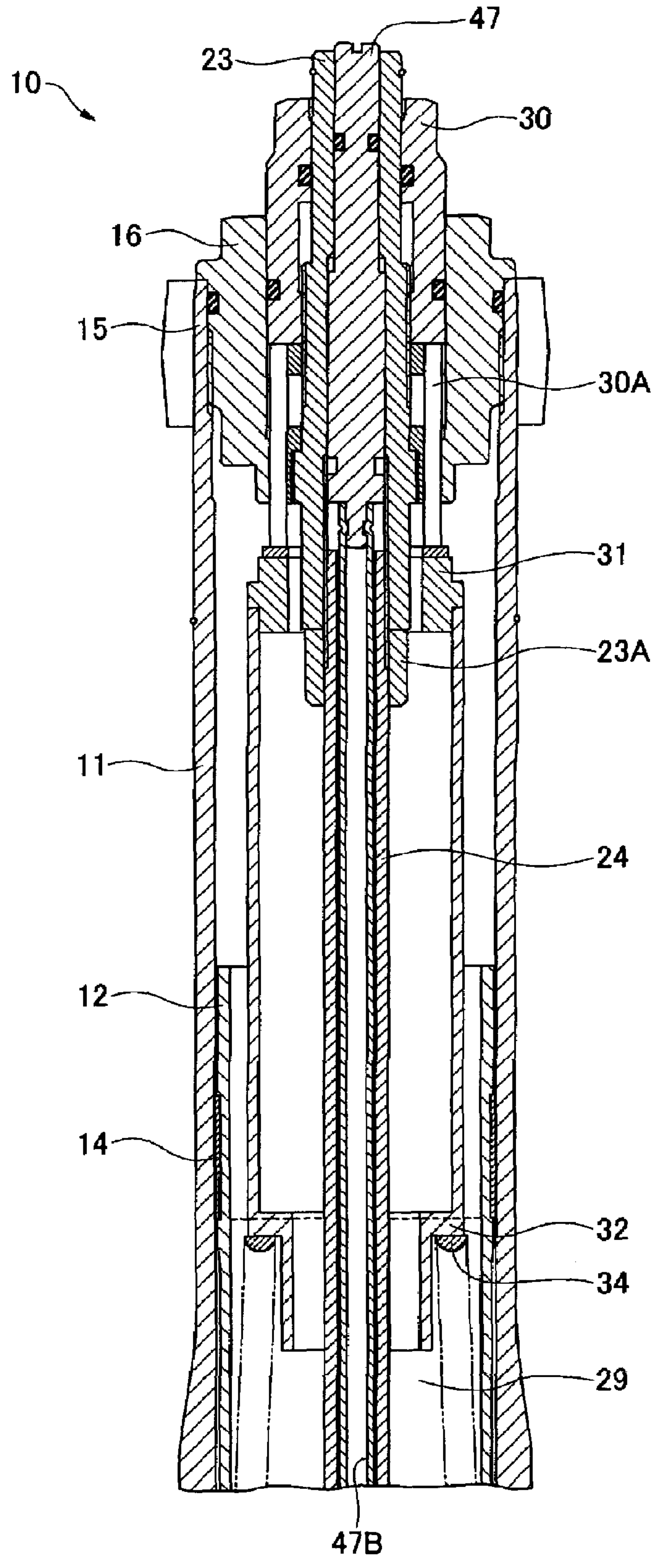
FIG. 4 is a cross sectional view showing an upper structure in FIG. 1.

The front fork 10 comprises, as shown in FIG. 4, a sleeve 23 screwed to a center portion of the cap 16 so as to be integrally fixed. A hollow piston rod 24 and a lock nut 23A are screwed to a lower end portion of the sleeve 23 inserted to an inner portion of the vehicle body side tube 11. The piston rod 24 is fixedly supported to the vehicle body side tube 11. The piston rod 24 slidably passes through a rod guide 25 provided in an upper end portion of the damper cylinder 21 so as to be inserted to an oil chamber 27 in an inner portion of the damper cylinder 21, and is provided with a piston 26 in a piston bolt 24A provided in an insertion leading end portion. The piston 26 is fixed by a nut 24B which is screwed to the piston bolt 24A. The piston 26 vertically slides along an inner surface of the damper cylinder 21. The oil chamber 27 is sectioned by the piston 26 into a piston rod side oil chamber 27A in a side to which the piston rod 24 is inserted. A piston side oil chamber 27B is in a side to which the piston rod 24 is not inserted.

The front fork 10 is arranged between the vehicle body side tube 11 and the axle side tube 12 such that an oil reservoir chamber 28 is formed in a space in an outer periphery of the damper cylinder 21, and a gas chamber (an air chamber) 29 is formed in an upper portion of the oil reservoir chamber 28.

The front fork 10 comprises a spring load adjuster 30 inserted to an annular space between the cap 16 and the sleeve 23 screwed to an outer periphery of the sleeve 23. A spring collar 31 is formed by combining a plurality of members which are supported by a pin 30A striking against a lower end surface of the spring load adjuster 30 and elevated. A suspension spring 34 is interposed between an upper spring seat 32 backed up by the spring collar 31 and a lower spring seat 33 fixed to an upper end surface of the rod guide 25 in the upper end portion of the damper cylinder 21.

The front fork 10 buffers an impact force applied from a road surface when the vehicle runs, on the basis of a spring reaction force of the suspension spring 34, and a spring reaction force by an air spring in the air chamber 29.

The front fork 10 has an expansion side damping force generating means 40 and a compression side damping force generating means 50 in order to control stretching vibration of the suspension spring 34, and the air spring in the air chamber 29.

Expansion Side Damping Force Generating Means 40

Figure 3:
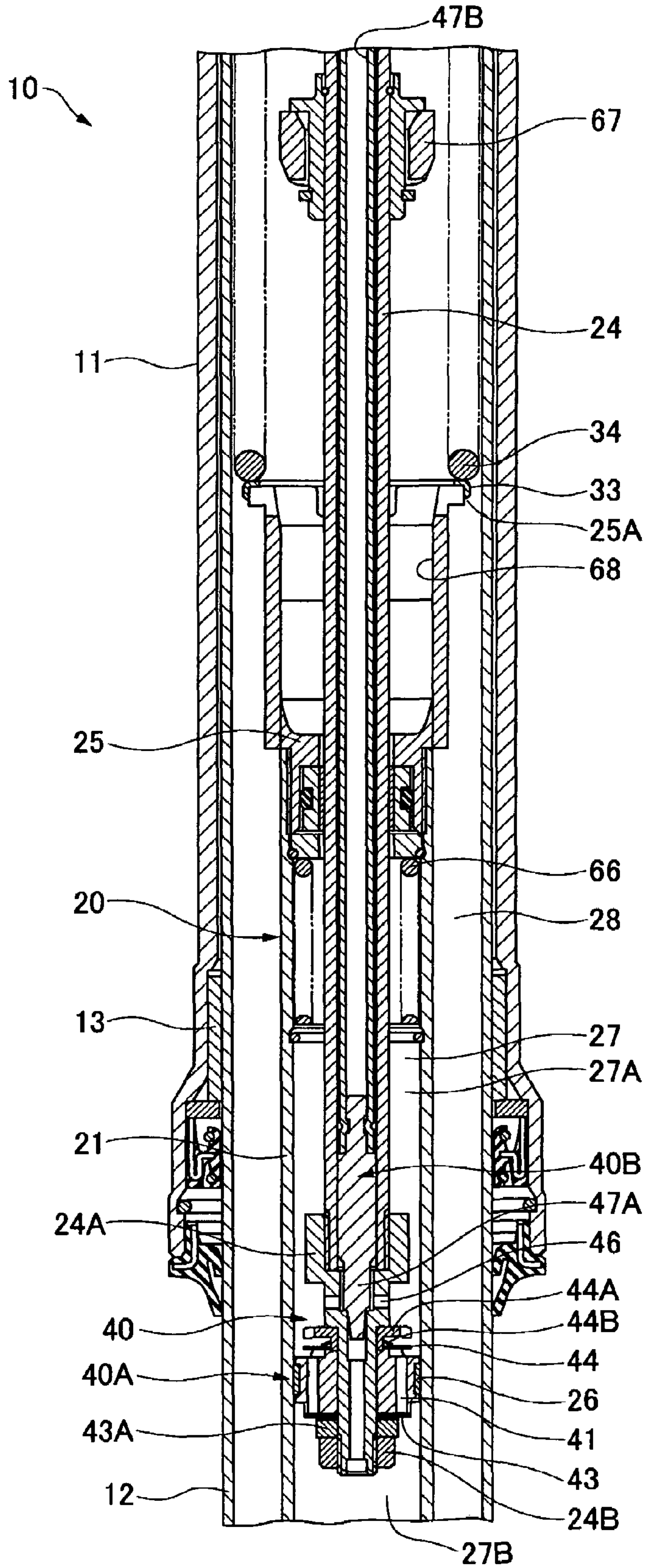
FIG. 3 is a cross sectional view showing an intermediate structure in FIG. 1.

The expansion side damping force generating means 40 comprises a piston and valve assembly 40A which is provided in a leading end portion of the piston rod 24 and sliding within the damper cylinder 21. The piston and valve assembly 40A comprises, as shown in FIG. 3, an expansion side oil passage 41 and a compression side oil passage 42 allowing the piston rod side oil chamber 27A and the piston side oil chamber 27B to be in communication are provided in the piston 26 which is in slidable contact with an inner surface of the damper cylinder 21. The expansion side oil passage 41 can be opened and closed by the expansion side damping valve 43. The compression side oil passage 42 can be opened and closed by the check valve 44. The expansion side damping valve 43 is supported by a valve stopper 43A supported by a nut 24B. The check valve 44 is supported by a valve spring 44B which is held by a spring receiver 44A locked to the piston rod 24, and is closed during expansion and is opened during compression.

The expansion side damping force generating means 40 has an expansion side damping force adjusting apparatus 40B. The expansion side damping force adjusting apparatus 40B has a bypass oil passage 46 which can communicate the piston rod side oil chamber 27A with the piston side oil chamber 27B bypassing the piston 26, in an inner portion of the piston rod 24 (the piston bolt 24A), and can open and close the bypass oil passage 46 by a needle valve 47A. At this time, a damping force adjuster 47 is screwed to a center of the sleeve 23 provided in the cap 16. A rod 47B supported to the damping force adjuster 47 is inserted to a hollow portion of the piston rod 24. The needle valve 47A mentioned above is provided in an insertion end thereof.

Compression Side Damping Force Generating Means 50

Figure 2:
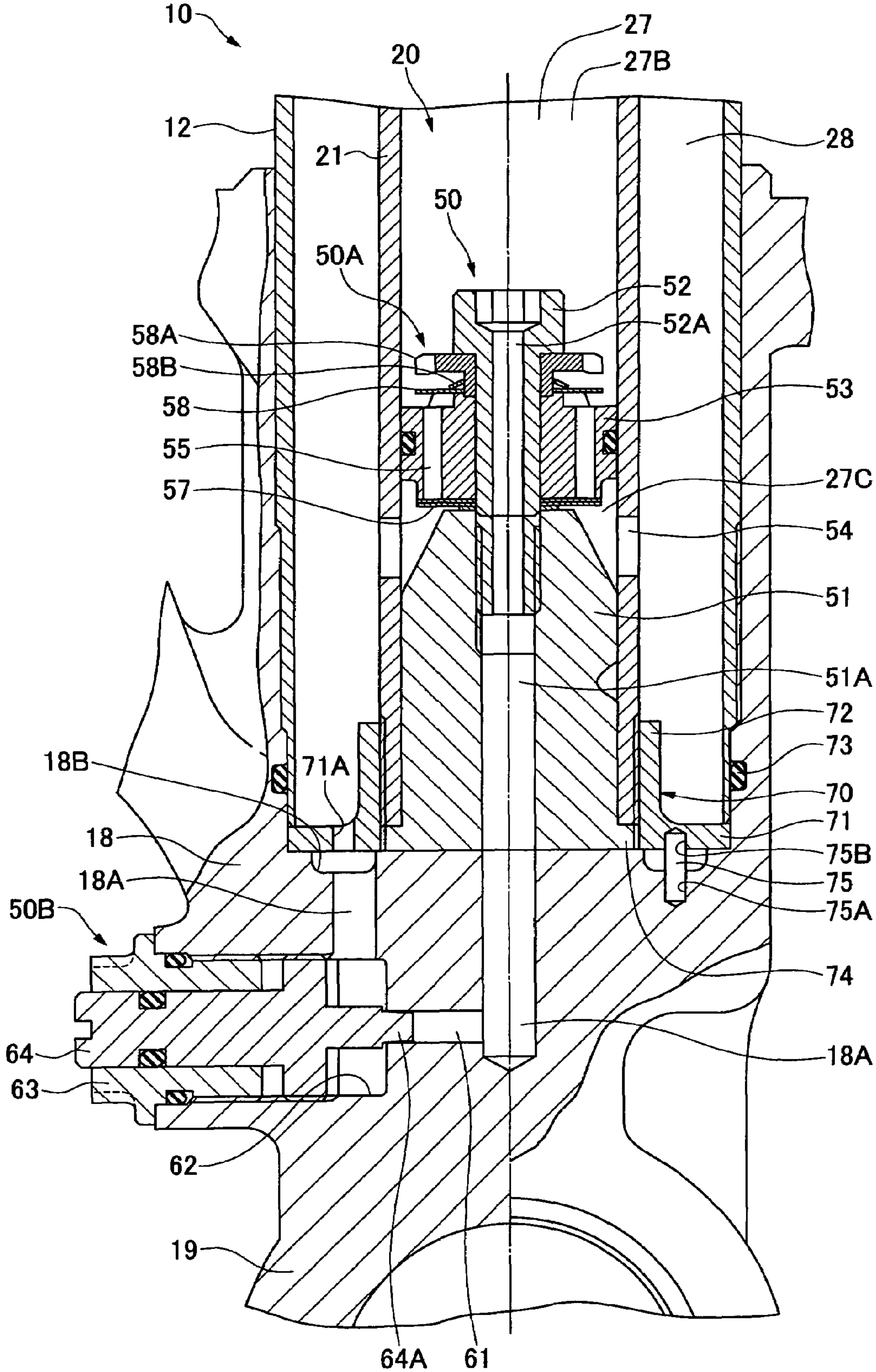
FIG. 2 is a cross sectional view showing a lower structure in FIG. 1.

The compression side damping force generating means 50 comprises a compression side partition wall member and valve assembly 50A provided in a leading end portion of a holder 51 arranged in an inner periphery of a lower end portion of the damper cylinder 21 in a manner mentioned below. The compression side partition member and valve assembly 50A comprises, as shown in FIG. 2, a compression side partition wall member 53 fixed to an upper end surface of the holder 51 within the damper cylinder 21 by a hollow bolt 52 screwed to a center portion of the holder 51. The piston side oil chamber 27B mentioned above is sectioned in an upper portion of the compression side partition wall member 53, and a lower oil chamber 27C is sectioned in a lower portion of the compression side partition wall member 53. The lower oil chamber 27C is communicated with the oil reservoir chamber 28 by an oil hole 54 provided in the damper cylinder 21. The compression side partition wall member 53 is provided with a compression side oil passage 55 and an expansion side oil passage 56 which can communicate the piston side oil chamber 27B with the lower oil chamber 27C. The compression side oil passage 55 can be opened and closed by a compression side damping valve 57, and an expansion side oil passage 56 can be opened and closed by a check valve 58. The compression side damping valve 57 is clamped between the holder 51 and the compression side partition wall member 53. The check valve 58 is supported by a valve spring 58B which is held by a spring receiver 58A locked to the hollow bolt 52, and is closed during compression and is opened during expansion.

The compression side damping force generating means 50 has a compression side damping force adjusting apparatus 50B. The compression side damping force adjusting apparatus 50B can communicate the piston side oil chamber 27B with the oil reservoir chamber 28 bypassing the compression side partition wall member 53. This occurs via a hollow portion 52A of the hollow bolt 52, an oil passage 51A provided in a center portion of the holder 51, an oil passage 18A provided in the axle bracket 18, an annular groove 18B provided in a bottom portion of the axle bracket 18, and a bypass oil passage 61 communicating an oil passage 71A provided in a seat member 70 mentioned below. The compression side damping force adjusting apparatus 50B comprises a horizontal hole 62 communicating with the oil passage 18A formed in the axle bracket 18. A damping force adjuster 64 is screwed to a center of a cap 63 sealed into the horizontal hole 62. The oil passage 18A can be opened and closed by a needle valve 64A in a leading end of the damping force adjuster 64. The compression side damping force adjusting apparatus 50B can adjust a compression side damping force during low speeds.

Accordingly, the front fork 10 is operated in the following manner.

Expansion Stroke

During expansion of the front fork 10, the vehicle body side tube 11 and the axle side tube 12 are relatively expanded, and the suspension spring 34 is expanded. Further, the piston rod 24 comes out of the damper cylinder 21. The oil in the piston rod side oil chamber 27A flows to the piston side oil chamber 27B through the bypass oil passage 46 of the piston 26 during low speeds, and the expansion side damping force is obtained on the basis of a throttle resistance of the needle valve 47A therebetween. Further, during middle and high speeds, the oil in the piston rod side oil chamber 27A flows to the piston side oil chamber 27B through the expansion side oil passage 41 of the piston 26. The expansion side damping force is obtained on the basis of a deflection resistance of the expansion side damping valve 43 therebetween. The expansion side damping force prevents a resonance of the suspension spring 34.

The working oil corresponding to a volume at which the piston rod 24 comes out passes through the expansion side oil passage 56 of the compression side partition wall member 53 from the oil reservoir chamber 28, and opens the check valve 58 so as to be supplied to the piston side oil chamber 27B.

In this case, a rebound spring 66 is equipped just below the rod guide 25 in the inner portion of the damper cylinder 21, and the rebound spring 66 is brought into contact with the expanded portion of the piston bolt 24A at a point of maximum expansion so as to buffer during the time of maximum expansion.

Compression Stroke

During compression of the front fork 10, the vehicle body side tube 11 and the axle side tube 12 are relatively compressed, and the suspension spring 34 is compressed. Further, the piston rod 24 moves forward to the damper cylinder 21. The oil in the piston rod side oil chamber 27B flows to the piston rod side oil chamber 27A through the check valve 44 of the compression side oil passage 42 in the piston 26. Further, the oil corresponding to a volume at which the piston rod 24 moves forward flows to the oil reservoir chamber 28 through the bypass oil passage 61 of the compression side partition wall member 53 from the piston side oil chamber 27B during low speeds. The compression side damping force is obtained on the basis of a throttle resistance of the needle valve 64A therebetween. Further, during middle and high speeds, the oil flows to the lower oil chamber 27C and the oil reservoir chamber 28 through the compression side oil passage 55 of the compression side partition wall member 53 from the piston side oil chamber 27B. The compression side damping force is obtained on the basis of a deflection resistance of the compression side damping valve 57 therebetween. The spring force of the suspension spring 34 buffers the impact during compression, and the compression side damping force controls the compression speed of the suspension spring 34.

In this case, an oil lock piece 67 is equipped in an intermediate portion of the piston rod 24 existing in an outer portion of the damper cylinder 21. The oil lock piece 67 is fitted to an oil lock case 68 in an upper portion of the rod guide 25 during high compression so as to buffer during high compression.

Accordingly, in the front fork 10, the damper cylinder 21 and the holder 51 of the compression side partition wall member and valve assembly 50A are mounted to the axle bracket 18 in the following manner.

Mounting structure of damper cylinder 21 and holder 51 to axle bracket 18

As shown in FIG. 2, the seat member 70 is seated on a bottom portion in which the annular groove 18B of the axle bracket 18 is provided. The seat member 70 has an annular flat portion 71, and a tubular portion 72 risen up from an inner peripheral portion of the flat portion 71.

The axle bracket 18 is screwed to an outer periphery of a lower end portion of the axle side tube 12, and is provided with an O-ring 73 which is sealed between the axle bracket 18 and the outer periphery of the lowest end portion of the axle side tube 12. Further, an outer peripheral portion of the flat portion 71 in the seat member 70 is clamped and fixed between the bottom portion of the axle bracket 18 and the lowest portion of the axle side tube 12.

A flange 74 is provided in an outer periphery of a lower end portion of the holder 51 in which the compression side partition wall member and valve assembly 50A is provided. Further, the outer periphery of the lower end portion of the damper cylinder 21 is screwed to the tubular portion 72 of the seat member 70. The flange portion 74 of the holder 51 mentioned above is clamped and fixed between the lower end portion of the damper cylinder 21 and the bottom portion of the axle bracket 18.

Figure 6:
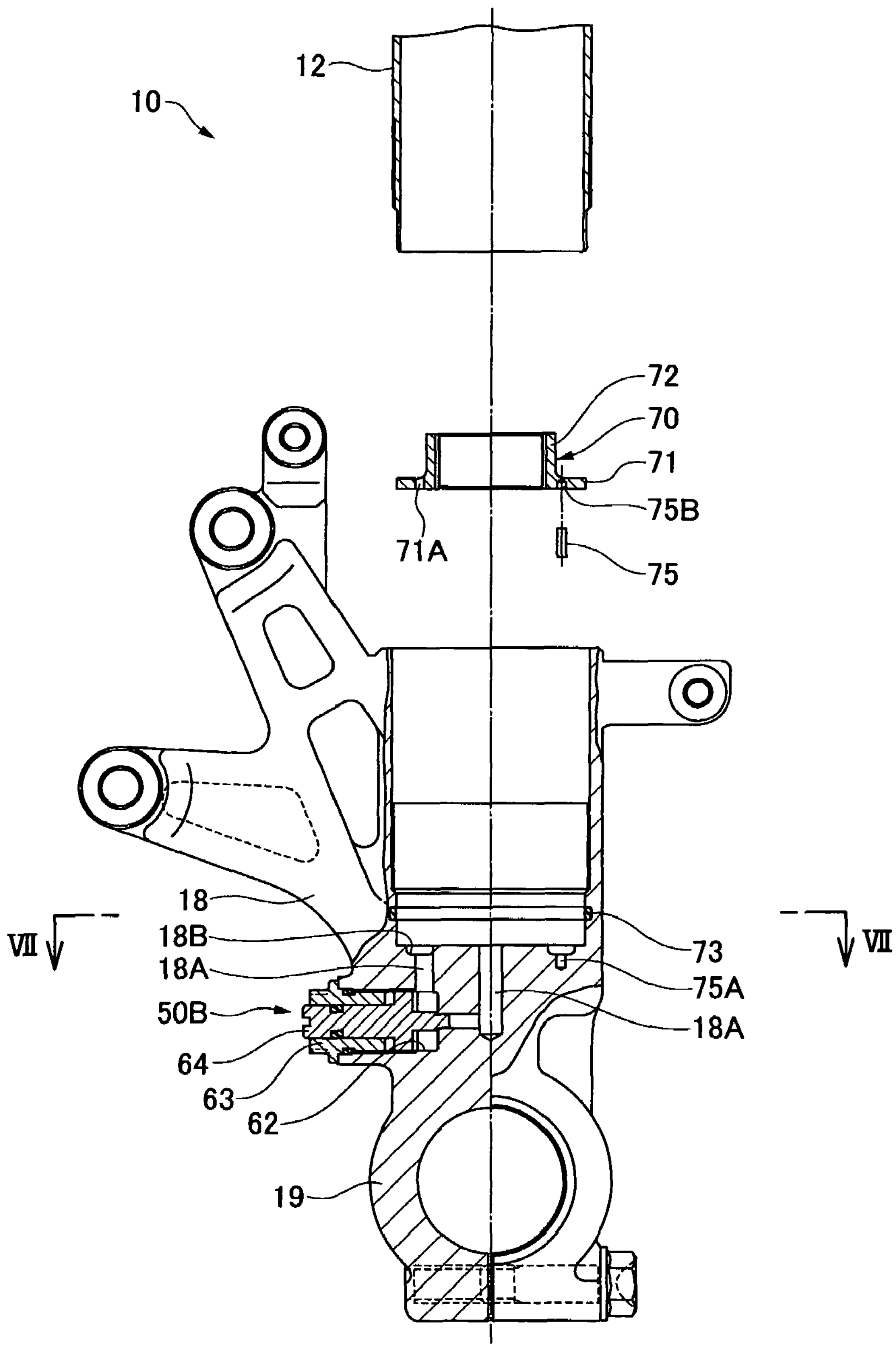
FIG. 6 is an enlarged view of a main portion in FIG. 5.
Figure 7:
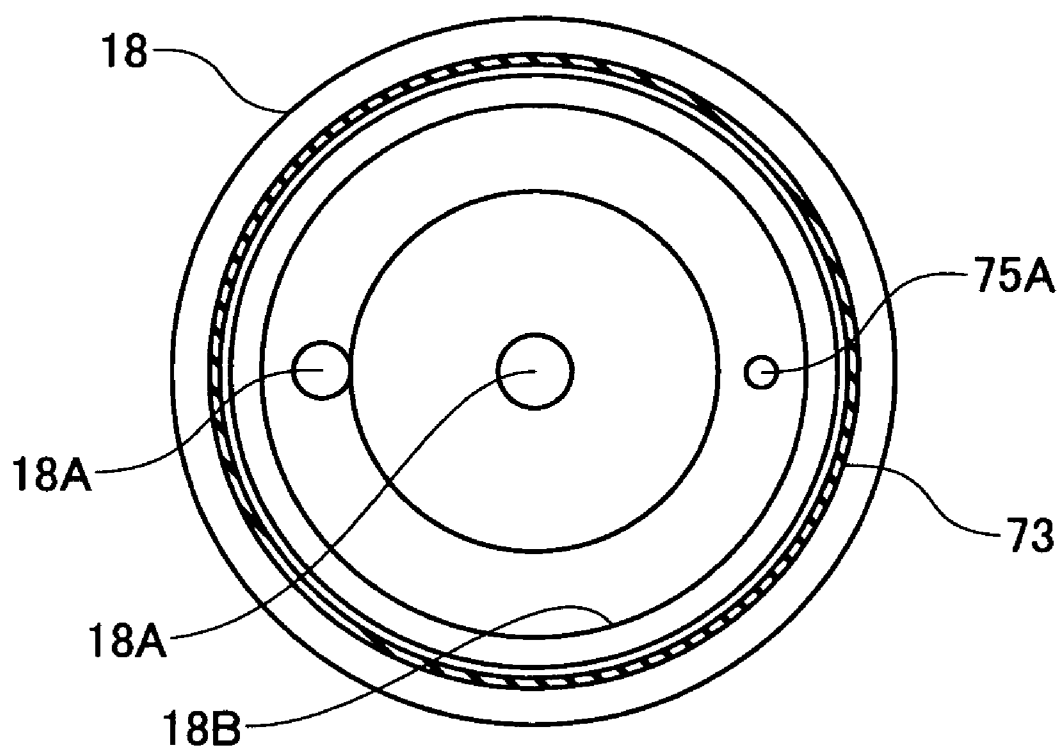
FIG. 7 is a view as seen from an arrow along a line VII—VII in FIG. 6.

In this case, the oil passage 71A comprising the bypass oil passage 61 mentioned above is provided in the flat portion 71 of the seat member 70. Further, a pin 75 is implanted to a pin hole 75A in the bottom portion of the axle bracket 18 (FIGS. 6 and 7). A pin hole 75B provided in the flat portion 71 of the seat member 70 is engaged and attached with the pin 75 of the axle bracket 18. The pin 75 functions as a rotation preventing pin for the seat member 70 with respect to the axle bracket 18, and a positioning pin for the axle bracket 18 and the seat member 70.

The seat member 70 is made of iron, and the axle bracket 18 is made of aluminum. The iron seat member 70 interposed between the lower end portion of the iron axle side tube 12 and the aluminum axle bracket 18 prevents the bottom portion of the axle bracket 18 from being depressed and plucked due to the matter that the axle side tube 12 is directly brought into contact with the axle bracket 18.

The axle side tube 12, the damper cylinder 21 and the holder 51 are mounted to the axle bracket 18 in accordance with the following procedure.

Figure 5:
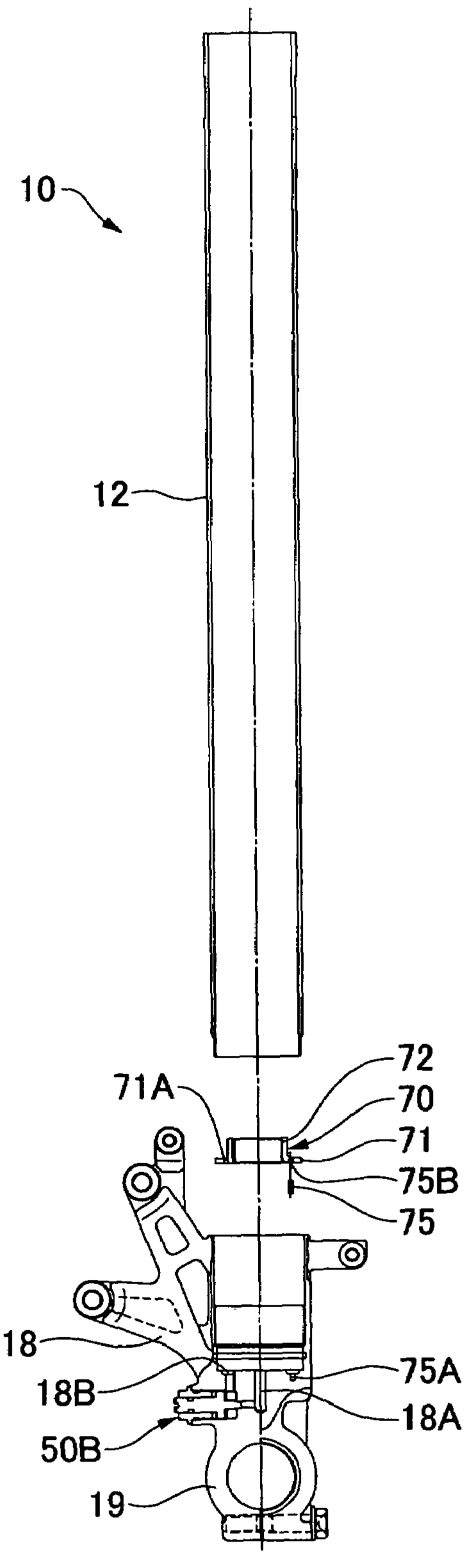
FIG. 5 is a cross sectional view showing an assembling process of an axle side tube of the front fork.

(1) The pin 75 is implanted to the bottom portion of the axle bracket 18, and the seat member 70 is seated on the bottom portion of the axle bracket 18 while using the pin 75 as the positioning pin (FIGS. 5 and 6).

(2) The axle bracket 18 is screwed to the outer periphery in the lower end portion of the axle side tube 12. The outer peripheral portion of the flat portion 71 of the seat member 70 is clamped between the bottom portion of the axle bracket 18 and the lowest end portion of the axle side tube 12 (FIGS. 8 and 9).

(3) The piston rod 24 is inserted to the inner portion of the damper cylinder 21 from the rod guide 25 of the damper cylinder 21, and the piston and valve assembly 40A is assembled in the leading end portion of the piston rod 24

Figure 8:
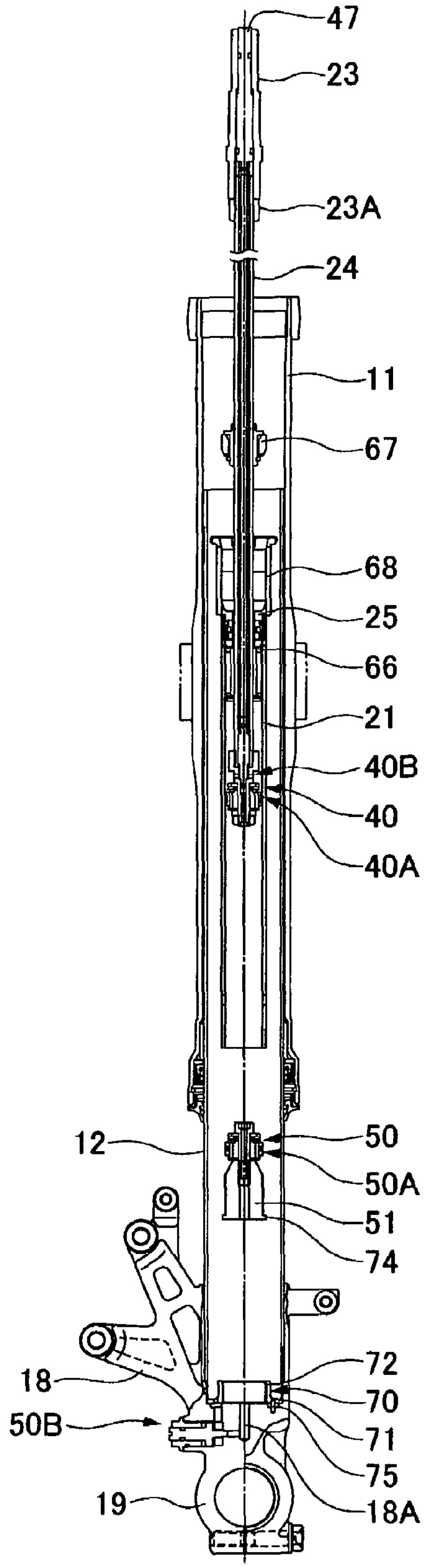
FIG. 8 is a cross sectional view showing an assembling process of a cylinder of the front fork.
Figure 9:
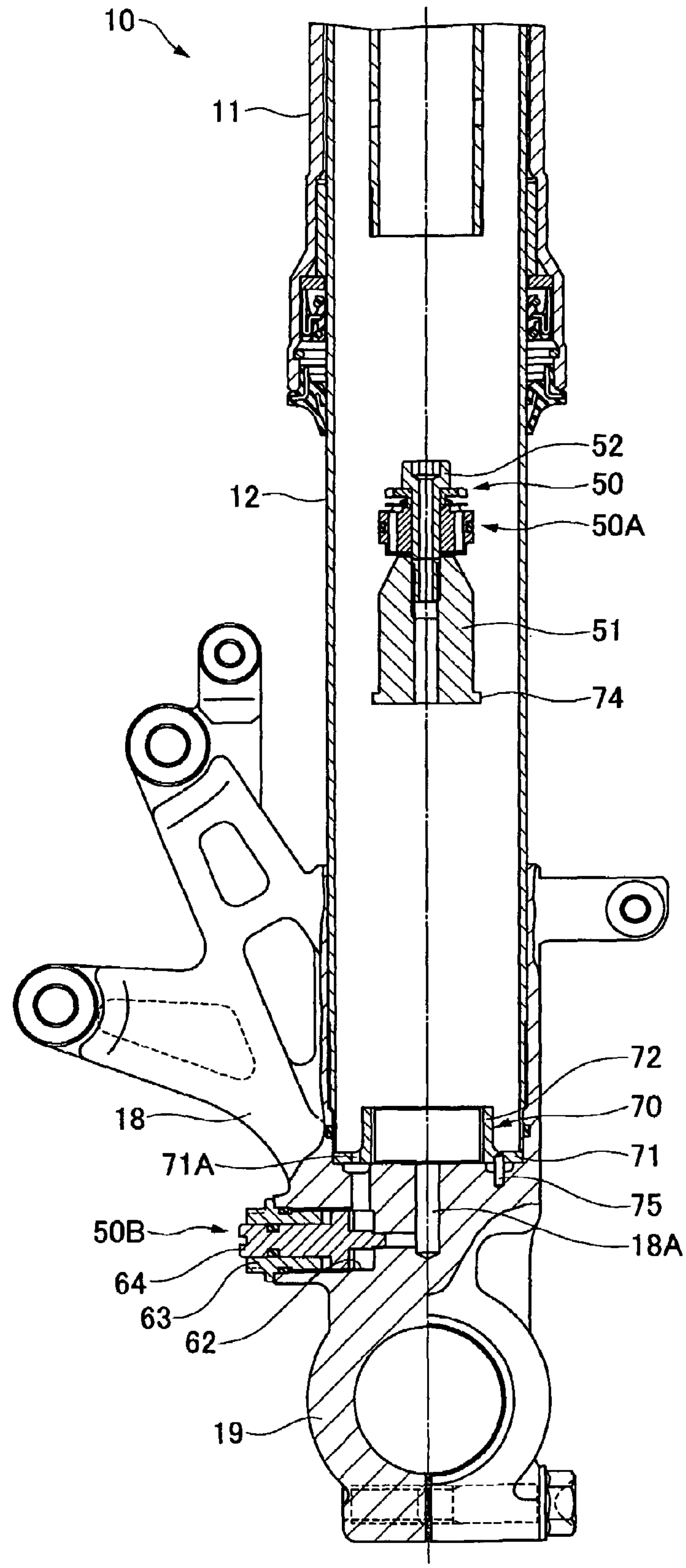
FIG. 9 is an enlarged view of a main portion in FIG. 8.

(FIG. 8). The holder 51 is lightly pressure inserted to the inner periphery in the lower end portion of the damper cylinder 21.

(4) The damper cylinder 21 is rotated by using a tool engagement portion 25A provided on an upper end surface of the rod guide 25 of the damper cylinder 21. The outer periphery of the lower end portion of the damper cylinder 21 is screwed to the tubular portion 72 of the seat member 70 mentioned in the item (2). The flange portion 74 of the holder 51 mentioned in the item (3) is clamped and fixed between the lower end portion of the damper cylinder 21 and the bottom portion of the axle bracket 18 (FIGS. 1 and 2).

(5) The vehicle body side tube 11 is fitted to the outer periphery of the axle side tube 12. The piston rod 24 mentioned in the item (3) is screwed to the sleeve 23 screwed to the cap 16 provided in the opening portion of the upper end of the vehicle body side tube 11 together with the lock nut 23A (FIG. 1).

In accordance with the present embodiment, the following operations and effects can be achieved.

(a) When rotating the damper cylinder 21 in the inner portion of the axle side tube 12 from the above and canceling the engagement between the damper cylinder 21 and the seat member 70, the damper cylinder 21 and the holder 51 can be freely separated from the bottom portion of the axle bracket 18 or the seat member 70. Accordingly, it is possible to take out the damper cylinder 21 and the compression side partition wall member and valve assembly 50A of the holder 51 from the axle side tube 12 to the upper side. It is easy to change the specification of the compression side partition wall member and valve assembly 50A and carry out the repair and replacement thereof (b) Since the compression side damping force adjusting apparatus 50B is provided in the bypass oil passage 61 formed in seat member 70 and the bottom portion of the axle bracket 18, it is possible to easily adjust the compression side damping force during low speeds.

(c) It is possible to fix the seat member 70 to the axle bracket 18 by the pin 75 so as to be prevented from rotating. It is possible to prevent the seat member 70 from rotating together with the damper cylinder 21 while rotating the damper cylinder 21 from the above. It is possible to rapidly cancel the engagement between the damper cylinder 21 and the seat member 70. Further, it is possible to position the seat member 70 and the bottom portion of the axle bracket 18 by the pin 75. It is also possible to align the bypass oil passages 61 provided in both the elements.

Figure 10:
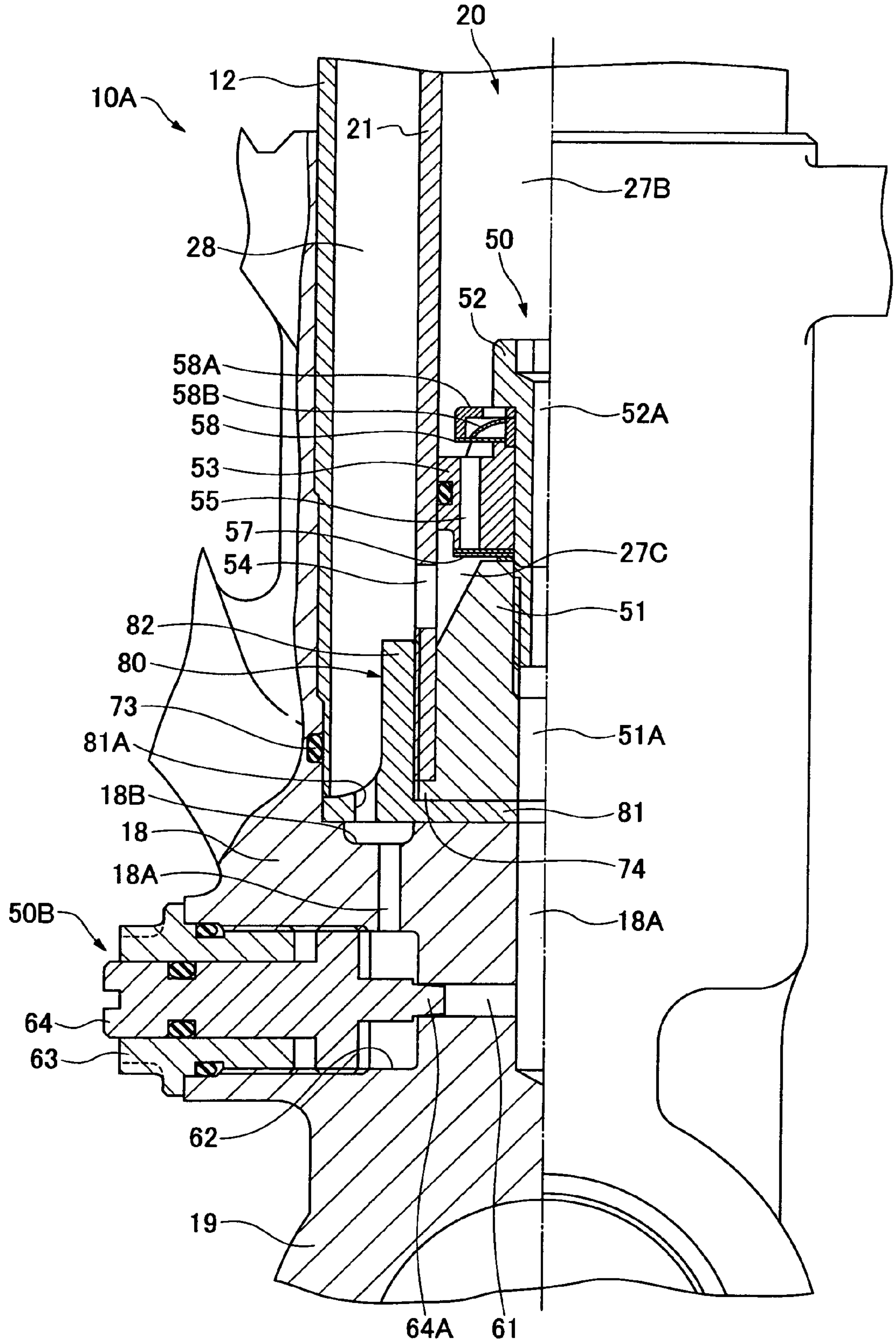
FIG. 10 is a cross sectional view showing a main portion of a modified embodiment of the front fork.

The front fork 10A in FIG. 10 is different from the front fork 10 in FIGS. 1 to 9 in that a seat member 80 is used in place of the seat member 70. The seat member 80 has a disc-shaped flat portion 81 and a tubular portion 82 rising within a surface of the flat portion 81.

An outer peripheral portion of the flat portion 81 of the seat member 80 is clamped and fixed between the bottom portion of the axle bracket 18 and the lowest end portion of the axle side tube 12. Further, the outer periphery of the lower end portion of the damper cylinder 21 is screwed to a tubular portion 82 of the seat member 80. The flange portion 74 of the holder 51 is clamped and fixed between the lower end portion of the damper cylinder 21 and the flat portion 81 in an inner peripheral side of the tubular portion 82 in the seat member 80.

In this case, the seat member 80 is provided with the same oil passage 81A as the oil passage 71A of the seat member 70 in the flat portion 81, and is provided with the same pin hole as the pin hole 75B in the seat member 70 for the pin 75 implanted on the bottom portion of the axle bracket 18, in the flat portion 81.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A front fork of a motor cycle comprising:

a vehicle body side tube and an axle side tube being slidably fitted;

an axle bracket being fixed to an outer periphery of a lower end portion of the axle side tube;

a cylinder inserted to the axle side tube being mounted to a bottom portion of the axle bracket, and a piston rod provided with a piston and valve assembly sliding within the cylinder in a leading end portion being mounted to the vehicle body side tube;

a compression side partition wall member and valve assembly being provided in an upper end portion of a holder provided in an inner periphery of a lower end portion of the cylinder; and an oil reservoir chamber communicating with a lower oil chamber sectioned within the cylinder by the compression side partition wall member and valve assembly being provided between the axle side tube and the cylinder, an outer peripheral portion of a seat member being clamped and fixed between the bottom portion of the axle bracket and the lower end portion of the axle side tube, a flange portion being provided in an outer periphery of a lower end portion of the holder, and wherein the outer periphery of the lower end portion of the cylinder is screwed to the seat member, and an outer peripheral flange portion of the holder is clamped and fixed between a lower end portion of the cylinder and the bottom portion of the axle bracket or the seat member.

2. A front fork of a motor cycle as claimed in claim 1, wherein an oil passage communicating a piston side oil chamber sectioned within the cylinder by the compression side partition wall member and valve assembly with the oil reservoir chamber while bypassing the compression side partition wall member and valve assembly is arranged and constructed in the seat member and the bottom portion of the axle bracket, the axle bracket has a horizontal hole facing the oil passage and a compression side damping force adjusting apparatus utilized during low speed operation is provided within the horizontal hole.

3. A front fork of a motor cycle as claimed in claim 2, wherein a pin is insertable in the seat member and the bottom portion of the axle bracket.

4. A front fork of a motor cycle as claimed in claim 1, wherein the seat member has an annular flat portion and a tubular portion rising up from an inner peripheral portion of the flat portion, an outer peripheral portion of the flat portion clamped and fixed between a bottom portion of the axle bracket and a lowest portion of the axle side tube, and wherein an outer periphery of the lower end portion of the cylinder is screwed to the inner peripheral portion of the tubular portion.

5. A front fork of a motor cycle as claimed in claim 1, wherein the seat member has a disc-shaped flat portion and a tubular portion rising up from an inner peripheral portion of the flat portion, an outer peripheral portion of the flat portion clamped and fixed between the bottom portion of the axle bracket and the lowest end portion of the axle side tube, and wherein an outer periphery of the lower end portion of the cylinder is screwed to the inner peripheral portion of the tubular portion.

* * * * *